(12) United States Patent
Tan et al.

(10) Patent No.: US 6,710,135 B2
(45) Date of Patent: Mar. 23, 2004

(54) RESIN COMPOSITION AND USE THEREOF

(75) Inventors: Junji Tan, Sodegaura (JP); Kazuo Wakimura, Tokyo (JP); Shoji Obuchi, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/088,903

(22) PCT Filed: Jul. 27, 2001

(86) PCT No.: PCT/JP01/06498
§ 371 (c)(1),
(2), (4) Date: Mar. 25, 2002

(87) PCT Pub. No.: WO02/12395
PCT Pub. Date: Feb. 14, 2002

(65) Prior Publication Data
US 2003/0013821 A1 Jan. 16, 2003

(30) Foreign Application Priority Data
Aug. 2, 2000 (JP) .......................................... 2000-234182

(51) Int. Cl.[7] ............................ C08L 67/02; C08L 69/00
(52) U.S. Cl. ........................ 525/411; 525/413; 525/415; 525/450
(58) Field of Search ................................ 525/411, 413, 525/415, 450

(56) References Cited

U.S. PATENT DOCUMENTS

| | | | |
|---|---|---|---|
| 2,758,987 A | | 8/1956 | Salzberg |
| 4,057,537 A | | 11/1977 | Sinclair |
| 4,920,203 A | * | 4/1990 | Tang |
| 5,475,063 A | * | 12/1995 | Kaplan |
| 5,525,646 A | * | 6/1996 | Lundgren |
| 5,747,390 A | * | 5/1998 | Cooper |

FOREIGN PATENT DOCUMENTS

| | | |
|---|---|---|
| EP | 0 896 013 A1 | 7/1998 |
| JP | 6-65360 A | 3/1994 |
| JP | 6-345956 A | 12/1994 |
| JP | 2571269 B2 | 10/1996 |
| JP | 2693584 B2 | 9/1997 |
| JP | 11-140292 A | 5/1999 |
| WO | 94/11441 * | 5/1994 |

* cited by examiner

Primary Examiner—David J. Buttner
(74) Attorney, Agent, or Firm—Burns, Doane, Swecker & Mathis, LLP

(57) ABSTRACT

A resin composition comprising:

30 to 95 parts by weight of a biodegradable polylactic acid resin (A), and 70 to 5 parts by weight of a specified polyalkylene carbonate (B), providing that the sum of components (A) and (B) is 100 parts by weight. The invention provides an excellent resin composition which is biodegradable, transparent, flexible and has gas barrier properties and which is free from the occurrence of bleedout with the passage of time. Further, the resin composition of the invention is excellent in moldability, so that a variety of molded articles can be produced by various molding techniques and put to practical use. The resultant molded articles, when disposed of after use, exhibit high biodegradability in natural environment.

10 Claims, No Drawings

RESIN COMPOSITION AND USE THEREOF

TECHNICAL FIELD

The present invention relates to a resin composition comprising a polylactic acid resin and a polyalkylene carbonate and to a use thereof. More particularly, the present invention relates to a resin composition comprising a polylactic acid resin and a polyalkylene carbonate, which is excellent in properties, such as flexibility, transparency, heat resistance and gas barrier properties, and which, after use, exhibits degradability in natural environment, and relates to a use thereof

BACKGROUND ART

Soft polyvinyl chloride, soft polyvinylidene chloride, polypropylene, polyethylene and the like are generally known as resins having flexibility and having high transparency and heat resistance.

However, these resins, when disposed of after use, increase the volume of refuse, and are further scarcely decomposed in natural environment with the result that, when buried, the resins semipermanently remain in the earth. Moreover, dumped plastics cause such problems that the sight is deteriorated and that the living environment for marine organism is damaged.

On the other hand, for example, a polylactic acid and a copolymer of polylactic acid and other aliphatic polyester (hereinafter referred to as "polylactic acids") and a polyester derived from an aliphatic polyhydric alcohol and an aliphatic polycarboxylic acid have been developed as biodegradable resins.

Some of the above resins are 100% biodegraded in animal bodies within a period of months to one year and also, when placed in soil or seawater, they initiate degradation in moist environment within some weeks and are eliminated within a period of about one year to some years. Biodegradable resins have such a characteristic that degradation products therefrom consist of lactic acid, carbon dioxide and water which are harmless to human health.

Among these biodegradable resins, expansion of the application field of the polylactic acids is especially expected because they have excellent properties such as high rigidity, and L-lactic acid which is the starting material thereof comes to be manufactured in a large amount with reduced cost by the fermentation process.

However, containers and packing materials obtained by molding polylactic acids by means of customary extrusion have poor flexibility although having high rigidity. Therefore, polylactic acids are not suitable for the use in packing materials requiring flexibility, such as a tube and a wrap film.

For imparting flexibility to polylactic acids, general technique for softening resins such as to employ the method of adding a plasticizer, the method of blending a soft polymer, or the method of effecting copolymerization with another monomer could be conceivable.

However, the addition of a plasticizer causes such a problem that the plasticizer bleeds out with the passage of time so as to be likely to bring about quality deteriorations such as stickiness and transparency lowering and to also cause deterioration of physical properties such as gas barrier properties and odor retaining capability. When blending the polylactic acids with a soft polymer, the compatibility is not necessarily satisfactory, so that there occurs such a problem that the transparency is likely to become poor. Further, the method of effecting copolymerization with another monomer necessitates a large reaction apparatus for polymer preparation and requires a prolonged reaction time, so that the method has a disadvantage of lacking simplicity.

Therefore, there is a demand for the development of a resin composition enhanced in flexibility containing a biodegradable resin such as a polylactic acid, which exhibits enhanced gas barrier properties without detriment to the excellent properties of biodegradable resin, and is free from the occurrence of bleedout with the passage of time.

In these circumstances, the inventor has made extensive and intensive investigations. As a result, it has been found that a resin comprising a biodegradable polylactic acid resin and a specified polyalkylene carbonate is biodegradable and is excellent in properties such as flexibility. The present invention has been completed on the basis of this finding.

Japanese Patent Laid-open Publication No. 6(1994)-345956 discloses a resin composition comprising a polyethylene carbonate, and a synthetic polymer that is degraded by microorganism, such as poly(3-hydroxybutyric acid) or polycaprolactone, and/or a natural polymer, such as starch, which is indicated as highly biodegradable. However, satisfactory attention was not paid to the transparency which is an important property for packing materials such as a film. Further, Japanese Patent Laid-open Publication No. 11(1999)-140292 discloses a resin composition containing a polylactic acid and a polycarbonate. However, in JP-A-11-140292, no attention was paid to gas barrier properties. The described polycarbonates would have low glass transition temperature, so that the gas barrier properties of obtained resin composition would be poorer than those of polylactic acid alone.

It is an object of the present invention to provide a resin composition which exhibits not only the high degradability inherently in the biodegradable polylactic acid resins but also high flexibility, transparency, heat resistance and gas barrier properties. It is another object of the present invention to provide a use thereof.

DISCLOSURE OF THE INVENTION

The resin composition of the present invention comprises:
30 to 95 parts by weight of a biodegradable polylactic acid resin (A), and
70 to 5 parts by weight of a polyalkylene carbonate (B) of the following formula (I), providing that the sum of components (A) and (B) is 100 parts by weight, and
satisfying that a pressed film of 0.1 mm thickness formed therefrom has a haze of 40% or less,

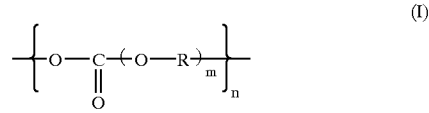

wherein R represents at least one group selected from the group consisting of an ethylene group, a propylene group and a group of the general formula (II):

(wherein each of $R^1$ and $R^2$ independently represents an alkylene group having 2 to 6 carbon atoms; and p is an integer of 1 to 15);

m is an integer of 1 to 15; and n is an integer of 3 to 15,000.

It is preferred that the resin composition of the present invention comprise:

- 40 to 90 parts by weight of the biodegradable polylactic acid resin (A), and
- 60 to 10 parts by weight of the polyalkylene carbonate (B), providing that the sum of components (A) and (B) is 100 parts by weight, and
- satisfying that a pressed film of 0.1 mm thickness formed therefrom has a haze of 40% or less.

In the present invention, it is preferred that the polyalkylene carbonate (B) be polyethylene carbonate.

The resin composition preferably satisfies that a pressed film of 0.5 mm thickness formed therefrom has a Young's modulus at 23° C. of 2500 MPa or less.

Also, preferably, the resin composition satisfies that a pressed film of 0.1 mm thickness formed therefrom has a carbon dioxide permeability coefficient at 25° C. of 85 cc mm/m$^2$ day atm or less.

The above resin composition of the present invention is preferably employed in the production of a molded article, such as a film, an oriented film, an injection-molded product, a blow-molded product, a laminate, a tape, a nonwoven fabric or a yarn.

BEST MODE FOR CARRYING OUT THE INVENTION

The present invention will be described in detail below.

The resin composition of the present invention comprises a biodegradable polylactic acid resin (A) and a polyalkylene carbonate (B). First, each of these components will be described.

Biodegradable Polylactic Acid Resin (A)

With respect to the biodegradable polylactic acid resin (A) for use in the present invention, the structure thereof is not limited and any one can appropriately be used as long as it is a polylactic acid resin having biodegradability. The terminology "biodegradable" used herein means that biodegradation can be recognized in, for example, the "Determination of the ultimate aerobic biodegradability and disintegration of plastic materials under controlled composting conditions" according to Iso 14855 (Japanese Industrial Standard K6953). Biodegradable polylactic acid resins, 60% or more of which is degraded within half a year in this determination method, are preferred.

Examples of the biodegradable polylactic acid resin (A) include polylactic acid, copolylactic acids such as a copolymer of lactic acid and hydroxycarboxylic acid and a copolymer of lactic acid, aliphatic polyhydric alcohol and aliphatic polybasic acid, and polymer blends or polymer alloys such as a mixture of polylactic acid and a copolymer of lactic acid and hydroxycarboxylic acid or a copolymer of lactic acid, aliphatic polyhydric alcohol and aliphatic polybasic acid.

As the raw materials for polylactic acid resin, there can be employed, for example, lactic acids, hydroxycarboxylic acids, aliphatic polyhydric alcohols and aliphatic polybasic acids.

Examples of the lactic acids include L-lactic acid, D-lactic acid, DL-lactic acid and mixtures thereof and further include lactides which are cyclic dimers of lactic acids.

Examples of the hydroxycarboxylic acids used in combination with lactic acids include glycolic acid, 3-hydroxybutyric acid, 4-hydroxybutyric acid, 4-hydroxyvaleric acid, 5-hydroxyvaleric acid and 6-hydroxycaproic acid, and further include cyclic ester intermediates of hydroxycarboxylic acids, for example, glycolide being a dimer of glycolic acid and ε-caprolactone being a cyclic ester of 6-hydroxycaproic acid.

Examples of the aliphatic polyhydric alcohols used in combination with lactic acids include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and 1,4-benzenedimethanol.

Examples of the aliphatic polybasic acids used in combination with lactic acids include succinic acid, oxalic acid, malonic acid, glutaricacid, adipic acid, pimelic acid, suberic acid, azelaic acid, sebacic acid, undecanedicarboxylic acid, dodecanedicarboxylic acid, phenylsuccinic acid and 1,4-phenylenediacetic acid.

These can be used individually or in combination of two or more.

Embodiments of polylactic acid resins which can be employed in the present invention include:

(1) lactic acid homopolymer, (2) copolylactic acids prepared from 50% by weight or more of lactic acid and 50% by weight or less of hydroxycarboxylic acid other than lactic acid, (3) copolylactic acids prepared from 50% by weight or more of lactic acid and 50% by weight or less of aliphatic polyhydric alcohol and aliphatic polybasic acid, and (4) copolylactic acids prepared from 50% by weight or more of lactic acid and 50% by weight or less of hydroxycarboxylic acid other than lactic acid, aliphatic polyhydric alcohol and aliphatic polybasic acid.

Herein, the copolylactic acid may be in the form of any of a random copolymer, a block copolymer or a mixture thereof.

Specific embodiments of copolylactic acids which can preferably be employed in the present invention include the followings:

(1) lactic acid block copolymer prepared from 50% by weight or more of lactic acid and 50% by weight or less of caproic acid, (2) lactic acid block copolymer prepared from 50% by weight or more of lactic acid and 50% by weight or less of 1,4-butanediol and succinic acid, (3) block copolymer comprising 50% by weight or more of polylactic acid segments and 50% by weight or less of polycaproic acid segments, and (4) block copolymer comprising 50% by weight or more of polylactic acid segments and 50% by weight or less of polybutylene succinate segments.

In the present invention, lactic acid homopolymer or a block copolymer comprising polylactic acid segments and polybutylene succinate segments and/or polycaproic acid segments can especially preferably be used as the polylactic acid resin.

The weight average molecular weight (Mw) and molecular weight distribution of polylactic acid resins preferably employed in the present invention are not particularly limited as long as, substantially, molding thereof can be effected.

Although the molecular weight of polylactic acid resins for use in the present invention is not particularly limited as long as substantially satisfactory mechanical properties can be exhibited, it is generally preferred that the weight average molecular weight (Mw) thereof be in the range of 10,000 to 500,000, especially 30,000 to 400,000, and more especially 50,000 to 300,000. Generally, when the weight average molecular weight (Mw) is smaller than 10,000, the mechanical properties may be unsatisfactory. On the other hand, when the weight average molecular weight exceeds 500,000, the handling thereof may be difficult, and an economic disadvantage may result.

These polylactic acids can be used individually or in arbitrary combination of two or more.

In the present invention, the process for producing the biodegradable polylactic acid resin (A) include the followings, although not particularly limited thereto:

(1) process wherein a mixture of lactic acid or a lactic acid compound and a hydroxycarboxylic acid compound as raw materials is directly subjected to dehydration polycondensation (for example, process disclosed in Japanese Patent Laid-open Publication No. 6(1994)-65360)

(2) indirect polymerization process wherein a cyclic dimer of lactic acid (lactide) is melt polymerized (for example, process disclosed in U.S. Pat. No. 2,758,987); and (3) ring-opening polymerization process wherein a cyclic dimer of the above lactic acid or hydroxycarboxylic acid such as lactide or glycolide, or cyclic ester intermediate such as ε-caprolactone are melt polymerized in the presence of a catalyst (U.S. Pat. No. 4,057,537).

In the production of polylactic acid resin, a partial copolymerization may be effected with an aliphatic polyhydric alcohol such as glycerol or trimethylolpropane, an aliphatic polybasic acid such as butanetetracarboxylic acid, or a polyhydric alcohol such as a polysaccharide. Further, the molecular weight thereof may be increased by the use of a binder (polymer chain extender) such as a diisocyanate.

In the production of polylactic acid resin through direct dehydration polycondensation of raw materials, the polylactic acid resin of high molecular weight having a strength suitable for the present invention can be obtained by polymerization according to the process wherein lactic acid or a lactic acid compound and a hydroxycarboxylic acid compound as raw materials are subjected to azeotropic dehydration condensation in preferably an organic solvent such as a phenyl ether solvent, especially preferably while removing water from the exiting solvent by azeotropic distillation and returning the resultant substantially anhydrous solvent to the reaction system.

In the present invention, the content of lactic acid component in a monomer mixture subjected to polymerization for polylactic acid is 50% by weight or more, preferably 60% by weight or more, more preferably 70% by weight or more, and optimally 80% by weight or more.

Polyalkylene carbonate (B)

The polyalkylene carbonate (B) for use in the present invention is represented by the formula:

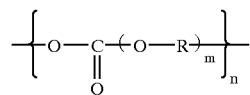

wherein R represents at least one group selected from the group consisting of an ethylene group, a propylene group and a group of the general formula (II):

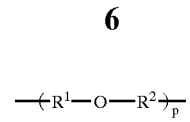

(wherein each of $R^1$ and $R^2$ independently represents an alkylene group having 2 to 6 carbon atoms; and p is an integer of 1 to 15);

m is an integer of 1 to 15, preferably 1 to 10; and n is an integer of 3 to 15,000, preferably 10 to 10,000.

With respect to the group represented by the above general formula (II), it is preferred that p be an integer of 1 or 2. Preferred examples include the groups of the formula (II) wherein P is 1, such as 3-oxapentanylene, 3-oxahexanylene, 3-oxaheptanylene, 3-oxa-1-methylpentanylene and 3-oxa-1-methylhexanylene groups.

With respect to the polyalkylene carbonate (B) for use in the present invention, the alkylene group represented by R in the above formula (I) may contain an alkylene group other than the ethylene group, propylene group and group of the general formula (II) in an amount not detrimental to the characteristics of the present invention, preferably an amount not exceeding 20 mol % of the alkylene groups. Examples of such other alkylene groups include saturated aliphatic groups such as methylene, trimethylene, tetramethylene, pentamethylene, hexamethylene, heptamethylene, octamethylene, nonamethylene, decamethylene, dodecamethylene, ethylethylene, 1,2-dimethylethylene, 1,1-dimethylethylene, propylethylene, 1-ethyl-2-methylethylene, butylethylene, pentylethylene, hexylethyleneandoctylethylene; alicyclic groups such as 1,2-cyclopentylene, 1,3-cyclopentylene, 1,2-cyclohexylene, 1,3-cyclohexylene, 1,4-cyclohexylene, 1,3-cyclohexanedimethylene, 1,4-cyclohexanedimethylene and cyclohexylethylene; and unsaturated aliphatic groups such as vinylethylene, allylethylene and isopropenylethylene. Further, an aromatic or heteroatom-containing group such as styrene, benzylethylene, m-phenylene, p-phenylene, 4,4'-diphenylene, 4,4'-bisphenylene-2,2-propane, 4,4'-bisphenylenesulfone or trifluoromethylethylene maybe contained therein.

With respect to the polyalkylene carbonate (B) for use in the present invention, it is preferred that 80 mol % or more, especially 90 mol % or more, of the alkylene group represented by R in the above formula (I) be an ethylene group. Among such polyalkylene carbonates, polyethylene carbonate is especially preferred.

It is also preferred that 80 mol % or more, especially 90 mol % or more, of the alkylene group represented by R in the above formula (I) be an ethylene group and a propylene group.

It is still also preferred that 80 mol % or more, especially 90 mol % or more, of the alkylene group represented by R in the above formula (I) be an ethylene group and a trimethylene group.

Although the molecular weight of polyalkylene carbonate (B) for use in the present invention is not particularly limited, it is generally preferred that the weight average molecular weight (Mw) thereof be in the range of 500 to 1,000,000, especially 2,000 to 500,000, and more especially 5,000 to 300,000. The molecular weight can be determined by conventional methods such as GPC.

The glass transition temperature of polyalkylene carbonate (B) for use in the present invention is preferably 40° C. or below. Low glass transition temperatures are preferred from the viewpoint that flexibility and impact resistance can be imparted to the resin composition. In the present invention, the glass transition temperature refers to the temperature measured by common DSC (differential scanning calorimeter) at a rate of temperature rise of 10° C./min.

The polyalkylene carbonate (B) for use in the present invention may be produced by any process, and is not particularly limited. Representative production processes are, for example, (1) process wherein a transesterification is performed between a carbonic acid ester such as dimethyl carbonate and a glycol; (2) process wherein a glycol is reacted with phosgene; (3) process wherein a cyclic carbonate is subjected to ring opening; and (4) process wherein an epoxide is copolymerized with carbon dioxide in the presence of a zincous solid catalyst component (Japanese Patent Nos. 2,571,269 and 2,693,584). The polyalkylene carbonate (B) can be produced by selecting an appropriate process, taking a desired molecular structure, etc. into account.

Resin Composition

The resin composition of the present invention comprises:
30 to 95 parts by weight of biodegradable polylactic acid resin (A), and
70 to 5 parts by weight of polyalkylene carbonate (B) of the above formula (I), providing that the sum of components (A) and (B) is 100 parts by weight.

The resin composition of the present invention preferably contains the polylactic acid resin (A) in an amount of 40 to 90 parts by weight, more preferably 45 to 80 parts by weight, and optimally 50 to 70 parts by weight. The resin composition preferably contains the polyalkylene carbonate (B) in an amount of 60 to 10 parts by weight, more preferably 55 to 20 parts by weight, and optimally 50 to 30 parts by weight.

In the resin composition of the present invention, it is preferred to employ the polylactic acid resin (A) and the polyalkylene carbonate (B) in the above amounts, because not only is flexibility imparted but also the gas barrier properties are improved without detriment to the transparency and heat resistance that are characteristic features of polylactic acid.

The resin composition of the present invention may contain resins other than the above polylactic acid resin (A) and polyalkylene carbonate (B) in a small amount not detrimental to the objects of the present invention. Further, the resin composition may contain various stabilizers, an ultraviolet absorber, a flame retarder, an internal mold release agent, a lubricant, a plasticizer, an organic filler, an inorganic filler, a pigment, a pigment dispersant and the like in conformity with intended use.

A film formed from the resin composition of the present invention exhibits a haze of 40% or less, preferably 30% or less, more preferably 20% or less, and optimally 10% or less.

The film for measuring haze is obtained by a process comprising first satisfactorily drying a resin composition, interposing a given amount thereof between two brass plates, aluminum plates and mold release films, subsequently melting the resin composition at 200° C., compressing the molten resin composition under 10 MPa for 1 min and thereafter subjecting the same to 10 MPa compression and cooling by means of a compression molding machine set for 0° C. so as to form a 100 $\mu$m thick film.

This film preferably exhibits a carbon dioxide permeability coefficient at 25° C. of 85 cc mm/m$^2$ day atm or less, more preferably 80 cc mm/m$^2$ day atm or less, and optimally 75 cc mm/m$^2$ day atm or less.

Sheets formed from the resin composition of the present invention preferably exhibit a Young's modulus at 23° C. of 2500 MPa or less, more preferably 2200 to 50 MPa, and optimally 2000 to 100 MPa.

The sheet for measuring Young's modulus is obtained by a process comprising first satisfactorily drying a resin composition, interposing a given amount thereof between two brass plates, aluminum plates and mold release films, subsequently melting the resin composition at 200° C., compressing the molten resin composition under 10 MPa for 1 min and thereafter subjecting the same to 10 MPa compression and cooling by means of a compression molding machine set for 0° C. so as to form a 500 $\mu$m thick sheet.

The process for producing the resin composition of the present invention is not particularly limited, and common processes for producing a resin composition comprising a thermoplastic resin can appropriately be employed.

For example, the process wherein the polylactic acid resin (A) such as the above-mentioned polylactic acid resin and the polyalkylene carbonate (B) are homogeneously mixed together by means of a high-speed agitator or a low-speed agitator and thereafter melt kneaded by means of a single screw or multiscrew extruder having satisfactory kneading capacity can be employed. Also, the process wherein raw materials in solid form are mixed together by means of, for example, a Henschel mixer or a ribbon blender can be employed. Further, the process of kneading and melting polymers, by means of, for example, an extruder can be employed. Moreover, the process wherein heating and melting are performed in a reaction vessel equipped with a vacuum device and an agitator, followed by kneading under ordinary pressure or in vacuum, can be employed. Of these processes, it is preferred in the present invention that the resin composition is prepared by the process wherein raw materials having mixed together in solid form are melt kneaded by means of a twin-screw extruder at 180 to 220° C.

The resin composition produced by the above processes, although may be in any of forms such as pellets, rods and powder, is preferably taken out in the form of pellets.

The obtained resin composition can be further subjected to a solid state polymerization. The solid state polymerization removes volatile low molecules from the resin composition and increases the molecular weight. The solid state polymerization can be accomplished, for example, by first heating satisfactorily predried resin composition pellets in a stream of inert gas, such as nitrogen gas, at 60 to 120° C. for 10 to 180 min so as to effect crystallization, and thereafter heating the resin composition pellets in a stream of inert gas, such as nitrogen gas, or in vacuum at 90 to 150° C. for 0.5 to 200 hr.

The resin composition of the present invention may be loaded with various stabilizers, an ultraviolet absorber, a flame retarder, an internal mold release agent, a lubricant, a plasticizer, an organic filler, an inorganic filler, a pigment, a pigment dispersant and the like in conformity with intended use. Appropriate addition of these enables fabricating molded articles having desirable properties, films, sheets, filaments, yarns, textiles and other processed articles.

High-performance processed products simultaneously having high transparency, flexibility and heat resistance can be obtained by annealing (heat treating) and/or drawing of a molded article, film, sheet, filament, yarn, textile and other processed articles as obtained from the resin composition of the present invention. Therefore, the resin composition of the present invention is preferably employed in the production of a film, an oriented film (especially, biaxially oriented film), an injection-molded product, a blow-molded product, a laminate, a tape, a nonwoven fabric, a yarn and other molded articles. Drawing and annealing conditions (temperature, temperature change and history, ratio, time, etc.) are not particularly limited as long as molded articles with desired performance and properties can be obtained.

Drawing conditions can generally be appropriately set taking into account, for example, the type, thermal properties and molecular weight of degradable polymer. Drawing temperature is generally selected within the range from the glass transition temperature of degradable polymer to the melting point of degradable polymer. For example, when the amount of polylactic acid resin contained in the resin composition is relatively high, it is generally preferred that the drawing temperature be in the range of about 60 to 160° C., especially about 60 to 100° C. Generally, the drawing ratio is preferably in the range of 2 to 20, more preferably 4 to 15.

With respect to the annealing, higher temperatures than the drawing temperature are selected. For example, when the amount of polylactic acid resin contained in the resin composition is relatively high, it is generally preferred that the annealing temperature be in the range of about 80 to 160° C., especially about 120 to 150° C. The annealing may be performed in a continuous or batchwise manner.

For example, in the annealing of film obtained from the resin composition of the present invention, a high-performance film exhibiting a haze of 10% or less and an elongation of 20% or more and having such properties that any deformation does not occur after heating at 120° C. for 10 min can easily be prepared by appropriately selecting annealing conditions. Annealing and/or drawing the film obtained from the resin composition of the present invention in the above manner enables imparting not only high transparency and flexibility but also extremely high heat resistance that could not be attained by annealed polycaprolactone or polybutylene succinate films.

It is generally preferred that the resin composition before molding according to the present invention be in the form of pellets, rods or powder. The resin composition of the present invention can be homogenized by means of a mixer and subjected to, for example, injection molding, blow molding or compression molding performed under customary molding conditions.

Molding and Processing of Resin Composition

The resin composition of the present invention is a material that is suitable for molding and processing such as extrusion, injection molding, calendering, blow molding or balloon molding.

The process for producing a molded or processed article according to the present invention will be described below.

(1) Extrusion Molding

In the extrusion molding, the resin composition of the present invention is molded into a film or sheet by the use of common T-die extruder.

(2) Injection Molding

In the injection molding, pellets of the resin composition of the present invention are melted and softened, and charged into a metal mold whose temperature is maintained at room temperature or below (−10 to 20° C.). Molded articles are obtained with a molding cycle of 20 to 35 sec.

(3) Blow Molding (Injection Blow Molding, Stretch Blow Molding or Direct Blow Molding)

For example, in the injection blow molding, pellets of the resin composition of the present invention are melted and charged into a metal mold by the use of common injection blow molding machine. Thus, preforms are obtained. Blow molded bottles are produced by reheating obtained preforms in an oven (furnace), placing them in a metal mold whose temperature is maintained at room temperature or below (−10 to 20° C.), and feeding compressed air to thereby effect blowing.

(4) Vacuum Forming or Vacuum Air-pressure Forming

Film or sheet preforms are produced in the same manner as in the above extrusion (1). Molded articles can be obtained by heating obtained preforms to thereby soften them and thereafter performing a vacuum forming or vacuum air-pressure forming thereof in a metal mold whose temperature is maintained at room temperature or below (−10 to 20° C.) by the use of common vacuum forming machine.

(5) Lamination Forming

In the lamination forming, a laminate can be obtained by any of the following methods;

the method wherein a film or sheet produced by the above extrusion (1) is laminated with another base material by an adhesive or heating;

the extrusion lamination method wherein, in the same manner as in the above extrusion (1), a molten resin is extruded through T-die directly onto a base material of, for example, paper, a metal or a plastic;

the co-extrusion method wherein, by the use of separate extruders, the resin composition of the present invention and a base material are separately melted, joined by means of a die head and simultaneously extruded; or the co-extrusion lamination method wherein these methods are combined.

(6) Tape Yarn Forming

In the tape yarn forming, the film or sheet formed in the same manner as in the above extrusion (1) is slit into pieces of specified width and monoaxially drawn by heating at 60 to 140° C., optionally further subjected to thermal setting at 80 to 160° C. Thus, desired shaped article can be obtained.

(7) Yarn Forming

In the yarn forming, a yarn can be obtained by the melt spinning process wherein, by means of an extruder, the resin composition is melted at 150 to 220° C. and discharged through a spinning nozzle. If desired, the resultant yarn can be monoaxially drawn by heating at 60 to 100° C., optionally further subjected to thermal setting at 80 to 140° C. Thus, desired yarn can be obtained.

(8) Nonwoven Fabric Forming

The nonwoven fabric can be obtained by spun bond process or the melt blown process. In the spun bond process, in the same manner as in the above yarn forming (7), melt spinning is performed through a multi-orifice spinning nozzle, and drawing is effected by the use of an air sucker disposed under the spinning nozzle to thereby form webs. Webs are piled on a collector surface, and thermocompression bonded by means of an embossing roll and a smoothing roll. Thus, a nonwoven fabric can be obtained. In the melt blown process, the molten resin having been discharged through a multi-orifice spinning nozzle is brought into contact with high-speed heated gas fed from a heated gas blow-off opening, so that the resin is converted to fine fibers. These fibers are piled on a moving support. Thus, a nonwoven fabric can be obtained.

Use of Resin Composition

The resin composition of the present invention can be molded or formed by the above various molding and processing processes, and can be appropriately used in a wide variety of application fields without any particular limitation. For example, the resin composition of the present invention can be molded or otherwise formed and appropriately used in a constituent of a writing tool such as a ball pen, a propelling pencil or an ordinary pencil, a toothbrush, a constituent of stationery, a golf tee, a constituent of a smoke golf bail for ball game opening ceremony, a capsule for oral medicine, a carrier for anal or vaginal suppository, a carrier for dermal or mucosal patch agent, a capsule for agricultural chemical, a fertilizer capsule, a capsule for seed and seedling, a compost, a reel for fishing line, a fishing float, an artificial bait for fishery, a lure, a fishery buoy, a hunting decoy, a hunting shot capsule, a camping outfit such as tableware, a nail, a pile, a binding material, a nonskid material for muddy and snow-covered roads, a block, etc.

Further, the resin composition of the present invention provides a material suitable to the production of a film, a gas permeable film or a sheet. The film, gas permeable film or sheet comprising the resin composition of the present invention can find appropriate application in, for example, a shopping bag, a garbage bag, a compost bag, a cement bag, a fertilizer bag, a film for food or confectionery packaging, a wrapping film for food, an agricultural or horticultural film, a greenhouse film, a packaging film for video or audio magnetic tape cassette product, a packaging film for flexible disc, a fence, an oil fence for ocean, river, lake or swamp, a pressure sensitive adhesive tape, an ordinary tape, a binding material, a waterproof sheet, an umbrella, a tent, a soil bag, a cement bag or a fertilizer bag.

In accordance with intended use, customary post-treatment or finishing, such as calendering, extrusion, screen printing, gravure printing, letterpress printing, intaglio printing, doctor blade coating, immersion, spraying, air brushing or electrostatic coating, can be applied to the molding, such as a film, gas permeable film or sheet, produced from the resin composition of the present invention.

The film or sheet produced from the resin composition of the present invention can be formed into a laminate of multilayer structure by laminating or bonding with a sheet of another material such as paper or another polymer.

Still further, the resin composition of the present invention is flexible, so that it can appropriately be used as a foamed product. The foam produced from the resin composition of the present invention can find appropriate application in, for example, a lunch box, tableware, a container for lunch or daily dish as vended in a convenience store, a cup for Chinese vermicelli, a cup as used in an automatic drink vending machine, a container or tray for food such as fresh fish, meat, vegetable, fruit, bean curd or daily dish, a truck box as used in a fresh fish market, a container for dairy product such as milk, yogurt or lactic acid beverage, a container for carbonated drink or other refreshing drink, a container for alcoholic drink such as beer or whisky, a cosmetic container, a detergent container, a bleacher container, a cool box, a flowerpot, a tape, a cushion material for use in transportation of an electrification product such as a television set or stereo equipment, a cushion material for use in transportation of a precision appliance such as a computer, a printer or a time piece, a cushion material for use in transportation of an optical device such as a camera, spectacles, a microscope or a telescope, a cushion material for use in transportation of a ceramic product such as glass or ceramic ware, a shade material, a heat insulating material or a soundproofing material.

Also, the foam comprising the resin composition of the present invention is suitable for medical or sanitary purposes. For example, the foam can find appropriate application in a bandage, a carrier for dermal or mucosal patch agent, a triangular bandage, an adhesive plaster, a towel, a disposable towel, a disposable wet towel, a hand towel, a duster, a tissue paper, a wet tissue paper for cleaning or disinfection, a wet tissue paper for baby hip wiping, a disposable diaper, a sanitary or menstrual napkin, a sanitary tampon, a blood absorbent tampon for operation or child birth, a sanitary cover stock material, a sterile bag, etc.

These medical and sanitary products can be subjected to sterilization by heating or steaming, sterilization by ethylene oxide gas, sterilization by aqueous hydrogen peroxide or ozone, sterilization by exposure to ultraviolet light or electromagnetic wave, sterilization by exposure to radiation such as gamma rays, or sterilization, pasteurization or disinfection according to common customary methods using, for example, a bactericide such as ethanol or benzalkonium chloride, followed by sterile packaging. Further, products can be produced and packaged in sterile or endotoxin-free conditions by performing processing in a clean bench or clean chamber into which ultraclean air can be fed in laminar flow through an HEPA filter.

Still further, the foam comprising the resin composition of the present invention can be appropriately used in general industries including agriculture, fishery, forestry, manufacturing, construction, civil engineering, transportation and traffic, and recreation activities including leisure and sports. For example, the foam can find appropriate application in an agricultural cheese cloth, an oil absorbent material, a soft ground reinforcement, an artificial leather, a lining for flexible disk, a soil bag, a heat insulating material, a soundproofing material, a cushion material, a furniture cushion material for bed or chair, a floor cushion material, a packaging material, a binding material, a nonskid material for muddy and snow-covered roads, etc.

The resin composition of the present invention can be manufactured into a yarn or textile having desirable properties and characteristics, for example, desirable dimension, sectional configuration, size (tex, denier, yarn number count, etc.), tensile strength and elongation, binding strength, heat resistance, percentage crimp, water absorbency, oil absorbency, bulkiness, nerve strength and feeling by appropriately setting reeling conditions, spinning conditions, knitting and weaving conditions, post-treatment conditions, dyeing conditions and processing conditions in conformity with intended use.

Yarns obtained by processing the resin composition of the present invention include a monofilament, a multifilament, a staple fiber, a tow, a high bulky staple fiber, a high bulky tow, a spun yarn, a union yarn, a finished yarn, a false twist yarn, a modified cross section yarn, a hollow fiber, a conjugated yarn, POY (partially oriented yarn), DTY (drawing textured yarn), POY-DTY, a sliver, etc. The textiles obtained by processing the resin composition of the present invention generally comprehend those recognized as a fibrous structure, such as a fabric, a knitted article, a nonwoven fabric, braids including a string and a rope, a cottonlike high bulky staple fiber, a sliver, a porous sponge, a felt, paper and a net.

Therefore, the textiles obtained by processing the resin composition of the present invention are suitable for use in, for example, a coat for common clothing or medical clothing, a working uniform, an operating gown, a nightgown, an underwear, a next-to-skin wear, a lining cloth, a headgear, a mask, a bandage, a triangular bandage, socks, women's stockings, women's foundation (a brassier, shorts, etc.), panty stockings, tights, hose, army socks, gloves, army gloves, a towel, gauze, a hand towel, a carpet, a mat, a curtain, a wall paper, a clothing core, an automobile inner trim, a mattress, a bag, a wrapping cloth, bedclothes, bedquilt cotton, a pillow cover, a blanket, a sheet, a heat insulating material for winter clothes, a lace, a tape, a synthetic/artificial hide, a synthetic/artificial fur, a synthetic/artificial suede, a synthetic/artificial leather and network pipes.

Also, the textiles obtained by processing the resin composition of the present invention are suitable for medical or sanitary purposes. For example, the textiles can find appropriate application in a suture for surgical operation, a bandage, a triangular bandage, an adhesive plaster, a towel, a disposable towel, a disposable wet towel, an office roll towel, a hand towel, a duster, a tissue paper, a wet tissue paper for cleaning or disinfection, a wet tissue paper for baby hip wiping, a disposable diaper, a disinfected cotton, a sanitary or menstrual napkin, a sanitary tampon, an underpad, a blood absorbent tampon for operation or child birth, a sanitary cover stock material, a sterile bag, a kitchen refuse net, a garbage bag, etc.

In the same manner as described above with respect to the foam, these medical and sanitary products can be subjected to sterilization, pasteurization or disinfection, followed by sterile packaging. Further, products can be produced and packaged in sterile or endotoxin-free conditions in the same manner as described above with respect to the foam.

Still further, the textiles obtained by processing the resin composition of the present invention can be appropriately used in general industries including agriculture, fishery, forestry, manufacturing, construction, civil engineering, transportation and traffic, and recreation activities including leisure and sports. For example, the textiles can find appropriate application in an agricultural cheese cloth, a net against insect and bird, a sieve, a fishing line, a fishing net, a casting net, a spreading net, an oil absorbent material, a net, a rope, a climbing rope, a sail, a hood, a tarpaulin, a Tycon, a container bag, an industrial transit bag, a cement bag, a fertilizer bag, a filter material, a water permeable cloth for reclamation, a reinforcement cloth for soft ground, an artificial leather, a felt for paper making, a lining for flexible disk, a tent, a soil bag, a planting net, a heat insulating material, a soundproofing material, a shade material, a shock eliminator material, a cushion material, a binding material, a nonskid material for muddy and snow-covered roads, network pipes, a drainage pipe for civil engineering and construction, etc.

Effect of the Invention

The present invention enables providing an excellent resin composition which is biodegradable and has transparency, flexibility and gas barrier properties and which is free from the occurrence of bleedout with the passage of time. The resin composition of the present invention has excellent moldability, so that it can be molded into a variety of shaped articles by various molding and processing methods and put to practical use. The thus obtained shaped articles, when disposed of after use, exhibit high biodegradability in natural environment.

EXAMPLE

The present invention will be further illustrated below with reference to the following Examples, which in no way limit the scope of the invention.

The properties of resin composition were measured and evaluated in the following manner.

(1) Glass Transition Temperature (Tg)

The glass transition temperature was measured by the use of a differential scanning calorimeter (model Pyris-I, manufactured by Perkin-Elmer Corp.). 10 mg of a sample was weighed out onto a sample pan from a satisfactorily predried resin. In a helium atmosphere, the sample was heated from room temperature to 200° C. (rate of temperature rise: 320° C./min), held at 200° C. for 10 min, rapidly cooled to −100° C. (rate of temperature drop: 320° C./min) and held at −100° C. for 10 min. Thereafter, the temperature was raised to 200° C. (rate of temperature rise: 10° C./min), during which measuring was effected. The glass transition temperature was determined with the use of an installed analytical software.

(2) Transparency (Haze)

A 100 $\mu$m thick pressed film obtained in a given manner was allowed to stand still in an atmosphere of 23° C. and 50% relative humidity for 3 days, and the haze thereof was measured with the use of haze meter (manufactured by Nippon Denshoku Kogyo Co., Ltd.). Smaller haze value means higher transparency.

(3) Flexibility (Young's Modulus)

A 0.5 mm thick pressed sheet obtained in a given manner was allowed to stand still in an atmosphere of 23° C. and 50% relative humidity for 3 days, and dumbbell specimens were cut out therefrom. A tensile test thereof was performed by means of tensile tester Instron 4501 (manufactured by Instron) under such conditions that the temperature was 23° C., the relative humidity 50% and the straining rate 100%/min, thereby determining the Young's modulus. Smaller Young's modulus value means greater flexibility.

(4) Evaluation of Heat Resistance

A 100 $\mu$m thick film was molded under given conditions and held at 110° C. for 40 min. A sample in the form of a strip of 2 mm width and 2 cm length was cut out therefrom. A creep test of the sample was carried out by the use of TMA (manufactured by Seiko Instruments Inc.) under a stress of 0.1 MPa in a nitrogen stream with the ambient temperature raised at a rate of 2° C./min. Heat resistance was evaluated by the temperature at which the strain became 10% or greater. Evaluation criteria are as follows:

A: exceeding 140° C., B: 140 to 90° C., and C: lower than 90° C.

(5) Gas Barrier Property (Carbon Dioxide Permeability Coefficient)

With respect to a 100 $\mu$m thick film obtained in a given manner, the carbon dioxide permeability properties were evaluated. The carbon dioxide permeability coefficient at 25° C. was measured by the use of gas permeability coefficient meter GPM-250 (manufactured by GL Science). Smaller permeability coefficient value means higher gas barrier properties.

(6) Evaluation of Degradability

A sheet of 500 $\mu$m thickness and 3 cm×3 cm size was formed, and buried in a compost of 58° C. and 60% by weight water content (components: rice hulls, kitchen refuse, poultry manure, excrement, etc.). The degradability of the sheet was observed.

A: degradation was observed within 180 days, and

C: degradation was not observed.

(7) Water Vapor Barrier Property of Film

With respect to an about 20 $\mu$m thick cast film obtained in a given manner, the water vapor permeability rate was measured at 25° C. in a relative humidity of 100%. The water vapor barrier property was evaluated by the value converted in terms of a relative humidity of 90%. The smaller the value, the higher the water vapor barrier property.

(8) Tensile Strength, Elongation, Flexural Strength and Flexural Modulus of Dumbbell Specimen Specimens obtained in a given manner were evaluated in accordance with ASTM D-790.

(9) Drop Impact Test

A 1000 ml container obtained in a given manner was charged with 800 ml of water, and dropped in a 20° C. atmosphere from a height of 1.5 m onto a concrete floor surface. The dropping was repeated until the container was broken, and the number of droppings performed until breakage was recorded. No further dropping was performed upon completion of 10 droppings.

Example 1

A glass reactor equipped with an agitator and a distillation tube was charged with 70 parts by weight of polylacticacid (LaceaH-100, produced by Mitsui Chemicals, Inc.) and 30 parts by weight of polyethylene carbonate (measured glass transition temperature: 13° C. and weight average molecular weight: 151,000). The distillation tube was connected to a vacuum device including a vacuum pump and a vacuum regulator, and had such a structure that evaporated matter could be distilled off.

The reactor was heated to 120° C., and inner pressure thereof was reduced to 1 torr, and then, held in that condition for 4 hr to thereby remove water from the resins. Subsequently, the pressure was returned to atmospheric pressure, and the reaction system was heated to 210° C. Thereafter, the resins were mixed in a nitrogen atmosphere of 50 torr for about 1 hr and 30 min. The pressure within the reaction system was returned to atmospheric pressure, and resin composition (A1) was taken out.

The thus obtained resin composition (A1) was satisfactorily dried, and a given amount thereof was interposed between two brass plates, aluminum plates and mold release films. The resin composition was melted at 200° C., compressed under 10 MPa for 1 min, and further subjected to cooling and compression under 10 MPa by means of a compression molding machine set for 0° C. In this manner, a 0.5 mm thick sheet and a 100 $\mu$m thick film were obtained. The thus obtained sheet and film were evaluated with respect to the transparency, flexibility, heat resistance, gas barrier properties and degradability. The evaluation results are shown in Table 1.

Example 2

Resin composition (A2) was produced in the same manner as in Example 1, except that the amounts of charged polylactic acid and polyethylene carbonate were changed to 60 parts by weight of polylactic acid and 40 parts by weight of polyethylene carbonate. The resin composition was molded and evaluated in the same manner as in Example 1, and the evaluation results are shown in Table 1.

Example 3

Resin composition (A3) was produced in the same manner as in Example 1, except that the amounts of charged polylactic acid and polyethylene carbonate were changed to 50 parts by weight of polylactic acid and 50 parts by weight of polyethylene carbonate. The resin composition was molded and evaluated in the same manner as in Example 1, and the evaluation results are shown in Table 1.

Example 4

Resin composition (A4) was produced in the same manner as in Example 1, except that the amounts of charged polylactic acid and polyethylene carbonate were changed to 40 parts by weight of polylactic acid and 60 parts by weight of polyethylene carbonate. The resin composition was molded and evaluated in the same manner as in Example 1, and the evaluation results are shown in Table 1.

Example 5

70 parts by weight of the same polylactic acid as used in Example 1 and 30 parts by weight of the same polyethylene carbonate as used in Example 1 were dried by means of a vacuum dryer at room temperature for 48 hr. The dried resins were mixed by means of the laboplastomill (manufactured by Toyo Seiki Co., Ltd.) having a cylinder temperature set at 200° C. for 15 min, thereby obtaining resin composition (A5) The resin composition was molded and evaluated in the same manner as in Example 1, and the evaluation results are shown in Table 1.

Comparative Example 1

100 parts by weight of the same polylactic acid as used in Example 1 only was subjected to the same molding and evaluation as performed in Example 1. The evaluation results are shown in Table 1.

Comparative Example 2

70 parts by weight of the same polylactic acid as used in Example 1 and 30 parts by weight of polycaprolactone (Celgreen RH-7, produced by Daicel Chemical Industries, Ltd.) in place of the polyethylene carbonate were mixed in the same manner as in Example 1, thereby obtaining resin composition (B1). The resin composition was molded and evaluated in the same manner as in Example 1, and the evaluation results are shown in Table 1. The resin composition, although being excellent in flexibility, exhibited poor transparency and poor gas barrier properties.

Comparative Example 3

100 parts by weight of the same polyethylene carbonate as used in Example 1 only was subjected to the same molding and evaluation as performed in Example 1. The evaluation results are shown in Table 1.

Comparative Example 4

50 parts by weight of poly(3-hydroxybutyric acid) (produced by Good fellow Cambridge, Ltd.) and 50 parts by weight of polyethylene carbonate were dried by means of a vacuum dryer at room temperature for 48 hr. The dried resins were mixed by means of the laboplastomill (manufactured by Toyo Seiki Co., Ltd.) having a cylinder temperature set at 190° C. for 15 min, thereby obtaining a resin composition. The resin composition was molded and evaluated in the same manner as in Example 1, and the evaluation results are shown in Table 1. The transparency thereof was poor.

Comparative Example 5

Mixing, molding and evaluation were performed in the same manner as in Comparative Example 4, except that 80 parts by weight of poly(3-hydroxybutyric acid) and 20 parts by weight of polyethylene carbonate were used. The evaluation results are shown in Table 1. The transparency of the resin composition was poor.

Comparative Example 6

The same reactor as used in Example 1 was charged with 100 parts by weight of propiolactone (produced by Tokyo Kasei Kogyo Co., Ltd.), 0.072 part by weight of stannous chloride and 0.78 part by weight of ethylene glycol, and satisfactorily purged with nitrogen. The mixture was agitated in a nitrogen atmosphere of atmospheric pressure at 14° C. for 3 hr. and further agitated under a reduced pressure of 1 torr at 140° C. for 4 hr. Thus, polypropiolactone was obtained.

Subsequently, 50 parts by weight of polypropiolactone and 50 parts by weight of polyethylene carbonate were charged into a similar reactor, and held under a reduced pressure of 1 torr at 120° C. for 4 hr to thereby remove water from the resins. Subsequently, the pressure was returned to atmospheric pressure, and the reaction system was heated to 200° C. Melt mixing was performed in a nitrogen atmosphere of 50 torr for 1 hr and 30 min. Thereafter, the pressure within the reaction system was returned to atmospheric pressure, thereby obtaining a resin composition. The resin composition was molded and evaluated in the same manner as in Example 1, and the evaluation results are shown in Table 1. The transparency thereof was poor.

obtained. The moldability of the resin composition was excellent, and the obtained film was transparent and flexible. With respect to the film, the water vapor permeability property was evaluated. The evaluation results are shown in Table 2.

TABLE 1

|  | Example 1 | Example 2 | Example 3 | Example 4 | Example 5 | Comp. Ex 1 | Comp. Ex 2 | Comp. Ex 3 | Comp. Ex 4 | Comp. Ex 5 | Comp. Ex 6 |
|---|---|---|---|---|---|---|---|---|---|---|---|
| PLA[*1] (pts. wt) | 70 | 60 | 50 | 40 | 70 | 100 | 70 | 0 |  |  |  |
| PEC[*2] (pts. wt) | 30 | 40 | 50 | 60 | 30 | 0 |  | 100 | 50 | 20 | 50 |
| PCL[*3] (pts. wt) |  |  |  |  |  |  | 30 |  |  |  |  |
| PHB[*4] (pts. wt) |  |  |  |  |  |  |  |  | 50 | 80 |  |
| PPL[*5] (pts. wt) |  |  |  |  |  |  |  |  |  |  | 50 |
| mixing method[*6] | method A | method A | method A | method A | method B | — | method A | — | method B | method B | method A |
| transparency haze (%) | 3 | 7 | 8 | 9 | 8 | 3 | 62 | 4 | 62 | 62 | 64 |
| flexibility (MPa) | 1890 | 1520 | 1180 | 660 | 1870 | 2650 | 1820 | 40 | 470 | 2550 | 11 |
| heat resistance | A | A | A | B | A | A | A | C | A | A | C |
| gas barrier property $PCO_2$ (cc mm/m$^2$ day atm) | 60 | 44 | 25 | 18 | 63 | 90 | 250 | 4.2 | 25 | 26 | 19 |
| degradability | A | A | A | A | A | A | A | A | A | A | A |

PLA[*1]: polyactic acid
PEC[*2]: polyethylene carbonate
PCL[*3]: polycaprolactone
PHB[*4]: poly(3-hydroxybutyric acid)
PPL[*5]: polypropiolactone
mixing method[*6]: method A = mixed in reaction vessel for 1 hr and 30 min
method B = mixed in laboplastomill for 15 min
method C = mixed by twin screw extruder Example 6

80 parts by weight of satisfactorily dried polylactic acid and 20 parts by weight of polyethylene carbonate were blended by means of 30 mm-diameter twin screw extruder (manufactured by Plastic Kogyo Kenkyusho) at a cylinder temperature of 210° C., thereby obtaining resin composition (A6). The resin composition was evaluated in the same manner as in Example 1. Thereafter, the resin composition was kneaded, melted and extruded by means of a 20 mm-diameter extruder equipped with a T-die at a cylinder temperature of 190° C. The extrudate was cooled by means of rolls set for 20° C. Thus, a 20 μm thick cast film was Examples 7 to 12

Mixing, molding and evaluation were performed in the same manner as in Example 6, except that the amounts of compounded components were as shown in Table 2. The evaluation results are shown in Table 2.

Comparative Example 7

With respect to polylactic acid alone, an evaluation was effected in the same manner as in Example 6. The film was harder than in Examples 7 to 12, and the water vapor barrier property thereof was inferior to those of the Examples.

TABLE 2

|  | Example 6 | Example 7 | Example 8 | Example 9 | Example 10 | Example 11 | Example 12 | Comp. Ex. 7 |
|---|---|---|---|---|---|---|---|---|
| PLA[*1] (pts. wt) | 80 | 70 | 60 | 55 | 50 | 45 | 40 | 100 |
| PEC[*2] (pts. wt) | 20 | 30 | 40 | 45 | 50 | 55 | 60 |  |
| mixing method[*6] | method C | method C | method C | method C | method C | method C | method C | — |
| transparency haze (%) | 4 | 3 | 3 | 5 | 6 | 8 | 8 | 3 |
| flexibility (MPa) | 2050 | 1480 | 1400 | 1390 | 1300 | 1030 | 610 | 2650 |
| heat resistance | A | A | A | A | A | A | B | A |
| gas barrier property $PCO_2$ (cc mm/m$^2$ day atm) | 81 | 63 | 49 | 37 | 24 | 21 | 16 | 90 |
| degradability | A | A | A | A | A | A | A | A |
| water vapor barrier property of film (25° C. 90% RH: g mm/m$^2$ day) | 3.5 | 3.2 | 2.5 | 2.3 | 2.2 | 2.5 | 2.2 | 4.1 |

PLA[*1]: polyactic acid
PEC[*2]: polyethylene carbonate
mixing method[*6]: method A = mixed in reaction vessel for 1 hr and 30 min
method B = mixed in laboplastomill for 15 min
method C = mixed by twin screw extruder

Example 13

The resin composition obtained in Example 6 was satisfactorily dried, and a given amount thereof was interposed between two brass plates, aluminum plates and mold release films. The resin composition was melted at 200° C., compressed under 10 MPa for 1 min, and further subjected to cooling and compression under 10 MPa by means of a compression molding machine set for 0° C. Thus, a 0.3 mm thick sheet was obtained. By using a film drawing machine, the obtained sheet was preheated at 80° C. for 2 min, drawn to a size of 3×3 times, and held in the drawn form at 80° C. for 1 min to thereby effect annealing. Thus, a biaxially oriented film of about 30 μm thickness was obtained. The film was uniform, and exhibited high drawability. The resultant film was transparent. The gas barrier property and water vapor permeability rate of the film were evaluated. The evaluation results are shown in Table 3. Both the gas barrier property and the water vapor barrier property were enhanced as compared with those attained in Example 6.

Examples 14 and 15

The same molding, drawing and evaluation as in Example 13 were carried out with respect to the resin compositions obtained in Examples 7 and 8. The evaluation results are shown in Table 3.

TABLE 3

|  | Example 13 | Example 14 | Example 15 |
|---|---|---|---|
| PLA*1 (pts.wt) | 80 | 70 | 60 |
| PEC*2 (pts.wt) | 20 | 30 | 40 |
| gas barrier property of film $PCO_2$ (cc mm/m² day atm) | 55 | 37 | 36 |
| water vapor barrier property of film (25° C. 90% RH: g mm/m² day) | 2.5 | 2.3 | 1.9 |

Example 16

Injection Molding

The resin composition obtained in Example 7 was satisfactorily dried. By using an injection molding machine equipped with a dehumidifying dryer, the resin composition was injected at a cylinder temperature of 140 to 190° C. and at a die temperature of 190° C. into a metal mold set at 10° C., thereby obtaining tensile and flexural dumbbell specimen moldings. The obtained dumbbell specimens were subjected to measurements of the flexural strength, flexural modulus, tensile strength and elongation, and results were 56 MPa, 1900 MPa, 43 MPa and 190%, respectively.

Example 17

Paper Laminating

The resin composition obtained in Example 7 was satisfactorily dried. By using an extruder equipped with a dehumidifying dryer and further equipped with a T-die of 600 mm width and 0.8 mm lip gap, the resin composition was melted and extruded at 200° C. onto a kraft paper (basis weight: 75 g/m²) at a take-up speed of 20 m/min. The film extrudability was excellent without film breakage. The thus obtained paper laminated article had a resin layer thickness of 20±2 μm, and the thickness precision was excellent.

Example 18

Stretch Blow Molding

The resin composition obtained in Example 7 was satisfactorily dried. By using an injection stretch blow molding machine, the resin composition was melted at a cylinder temperature of 140 to 190° C. and injected into a metal mold set at 10° C. Thus, 45 g of cold parison was obtained. The obtained parison was heated and softened at 100° C., and transferred into a metal mold of bottle configuration. Air was blown thereinto at pressure of 1 Mpa to thereby effect blow stretching to a longitudinal extension ratio of 3.5 and a horizontal extension ratio of 3. Thus, a cylindrical bottle of 75 mm opening diameter, 100 mm height and 1000 ml internal volume was obtained. The wall thickness of the bottle was 0.2 mm, and the bottle exhibited a haze of 2%.

This blow molded container was charged with 800 ml of water, and dropped in a 20° C. atmosphere from a height of 1.5 m onto a concrete floor surface. The dropping was performed 10 times, but it was not broken at all.

Example 19

Spinning (Multifilament)

The resin composition obtained in Example 7 was satisfactorily dried. By using a dry spinning machine equipped with a dehumidifying dryer, the resin composition was spun through a die having 20 orifices each of 0.2 mm diameter at 210° C., thereby obtaining a semi-oriented yarn. Spinning was satisfactorily accomplished without yarn breakage. The obtained yarn was drawn at 80 to 100° C., and thermally set at 120 to 140° C. The resultant yarn had a diameter of 5 d and a strength of 3.6±0.1 g/d.

Example 20

Tape Yarn Extrusion

The resin composition obtained in Example 7 was satisfactorily dried. By using a 60 mm extruder equipped with a T-die of 600 mm die width and 0.8 mm lip gap, and further equipped with a dehumidifying dryer, the resin composition was extruded into a 100 μm thick film at 150 to 210° C. The film was slit into 6 mm-width tapes, drawn 5 times at 65 to 80° C., and thermally set at 100 to 120° C. The obtained tapes each had a width of 3.5 mm and a thickness of 30 μm, and exhibited a strength of 3.9 g/d.

Example 21

Nonwoven Fabric Forming

The resin composition obtained in Example 7 was satisfactorily dried. The resin composition in the form of pellets was melted at 210° C., melt spun through a spinning nozzle having 90 orifices each of 0.35 mm diameter, and drawn by using an air sucker disposed 1300 mm under the spinning nozzle face so as to be piled on a moving collector surface. Thus, webs were formed. The drawing speed was about 3500 m/min.

The obtained webs were passed through a gap between a metal embossing roll heated at 80 to 100° C. and a metal smoothing roll heated at the same temperature so as to effect thermal bonding. Thus, a nonwoven fabric was obtained.

With respect to the obtained nonwoven fabric, the size of short fiber was 2.5 d, and the basis weight was 33 g/m². The nonwoven fabric was annealed in a 90° C. oven for 60 sec. The shrinkage factor determined from a dimensional change brought about by the annealing was 6.3%.

What is claimed is:

1. A resin composition comprising:
    30 to 95 parts by weight of a biodegradable polylactic acid resin (A), and 70 to 5 parts by weight of a polyethylene carbonate (B) of the following formula (I), providing that the sum of components (A) and (B) is 100 parts by weight, and satisfying that a pressed film of 0.1 mm thickness formed therefrom has a haze of 40% or less,

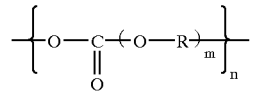

wherein R represents an ethylene group;
m is an integer of 1 to 15; and
n is an integer of 3 to 15,000.

2. The resin composition as claimed in claim 1, comprising:
   40 to 90 parts by weight of the biodegradable polylactic acid resin (A), and
   60 to 10 parts by weight of the poletthylene carbonate (B), providing that the sum of components (A) and (B) is 100 parts by weight, and
   satisfying that a pressed film of 0.1 mm thickness formed therefrom has a haze of 40% or less.

3. The resin composition as claimed in claim 2, further satisfying that a pressed film of 0.5 mm thickness formed therefrom, has a Young's modulus at 23° C. of 2500 MPa or less.

4. The resin composition as claimed in claim 3, further satisfying that a pressed film of 0.1 mm thickness formed therefrom, has a carbon dioxide permeability coefficient at 25° C. of 85 cc mm/in$^2$ day atm or less.

5. A molded article made of the resin composition claimed claim 4.

6. The molded article as claimed in claim 5, selected from the group consisting of a film, an oriented film, an injection-molded product, a blow-molded product, a laminate, a tape, a nonwoven fabric and a yarn.

7. The resin composition as claimed in claim 1, further satisfying that a pressed film of 0.5 mm thickness formed therefrom, has a Young's modulus at 23° C. of 2500 MPa or less.

8. The resin composition as claimed in claim 1 further satisfying that a pressed film of 0.1 mm thickness formed therefrom, has a carbon dioxide permeability coefficient at 25° C. of 85 cc mm/m$^2$ day atm or less.

9. A molded article made of the resin composition claimed in claim 1.

10. The molded article as claimed in claim 9, selected from the group consisting of a film, an oriented film, an injection-molded product, a blow-molded product, a laminate, a tape, a nonwoven fabric and a yarn.

* * * * *

UNITED STATES PATENT AND TRADEMARK OFFICE
CERTIFICATE OF CORRECTION

PATENT NO. : 6,710,135 B2  Page 1 of 1
APPLICATION NO. : 10/088903
DATED : March 23, 2004
INVENTOR(S) : Junji Tan et al.

It is certified that error appears in the above-identified patent and that said Letters Patent is hereby corrected as shown below:

In column 21, line 14, amend "m is an integer of 1 to 15; and" to -- m is an integer of 1; and --.

Signed and Sealed this

Fifth Day of January, 2010

David J. Kappos
*Director of the United States Patent and Trademark Office*